(12) United States Patent
Marshell et al.

(10) Patent No.: US 11,932,195 B1
(45) Date of Patent: Mar. 19, 2024

(54) SAFETY DEVICE FOR SECURING DISABLED PERSONS IN VEHICLES

(71) Applicants: Jodi Marshell, New Baltimore, MI (US); Terry Marshell, New Baltimore, MI (US)

(72) Inventors: Jodi Marshell, New Baltimore, MI (US); Terry Marshell, New Baltimore, MI (US)

( * ) Notice: Subject to any disclaimer, the term of this patent is extended or adjusted under 35 U.S.C. 154(b) by 172 days.

(21) Appl. No.: 17/705,686

(22) Filed: Mar. 28, 2022

Related U.S. Application Data

(60) Provisional application No. 63/167,081, filed on Mar. 28, 2021.

(51) Int. Cl.
  *B60R 22/14* (2006.01)
  *B60R 22/10* (2006.01)
(52) U.S. Cl.
  CPC ............ *B60R 22/105* (2013.01); *B60R 22/14* (2013.01)
(58) Field of Classification Search
  CPC ............................. B60R 22/14; B60R 22/105
  See application file for complete search history.

(56) References Cited

U.S. PATENT DOCUMENTS

| | | | |
|---|---|---|---|
| 3,321,247 A | 5/1967 | Dillender | |
| 4,226,474 A * | 10/1980 | Rupert | B60R 22/105 297/484 |
| 4,632,425 A | 12/1986 | Barratt | |
| 4,709,966 A | 12/1987 | Parkinson et al. | |
| 5,080,191 A * | 1/1992 | Sanchez | A47D 13/086 280/801.1 |
| 5,544,363 A * | 8/1996 | McCue | A62B 35/04 2/463 |
| 5,628,548 A * | 5/1997 | Lacoste | B60R 22/02 297/484 |
| 5,733,014 A | 3/1998 | Murray | |
| 7,017,525 B2 * | 3/2006 | Leach | A61G 7/1023 224/160 |

(Continued)

FOREIGN PATENT DOCUMENTS

| | | | | |
|---|---|---|---|---|
| CA | 2293942 A1 * | 5/2001 | ........... | A47D 13/086 |
| CN | 110154975 A * | 8/2019 | | |

(Continued)

*Primary Examiner* — Timothy J Brindley
(74) *Attorney, Agent, or Firm* — Christopher P. Maiorana, P.C.

(57) ABSTRACT

A restraint harness for securing a passenger in a seat of a vehicle includes a plurality of lateral straps, a pair of shoulder straps, a pair of crotch straps, and a plurality of D-ring connectors. The plurality of lateral straps may be configured to encircle a torso of the passenger. At least two lateral straps include a flexible portion allowing the restraint harness to accommodate a variety of torso diameters. The pair of shoulder straps generally extend over left and right shoulders of the passenger from an anterior side of the restraint harness to a posterior side of the restraint harness. The pair of crotch straps generally extend from an anterior side of the restraint harness to a posterior side of the restraint harness. The plurality of D-ring connectors is generally disposed on the posterior side of the restraint harness and configured to provide four points of attachment between the posterior side of the restraint harness and the seat of the vehicle.

19 Claims, 8 Drawing Sheets

(56) References Cited

U.S. PATENT DOCUMENTS

| | | | | |
|---|---|---|---|---|
| 8,702,177 B1 * | 4/2014 | Hogue | .................. | A61F 5/3769 |
| | | | | 297/484 |
| 9,907,370 B2 * | 3/2018 | Huddleston | ............ | A45B 11/02 |
| 11,014,526 B1 * | 5/2021 | Morgan | ................ | B60R 22/105 |
| 11,077,822 B2 * | 8/2021 | Macaluso | ............... | B60R 22/14 |
| 11,167,718 B2 * | 11/2021 | Archibald | ............. | B60R 22/105 |
| 2005/0179244 A1 * | 8/2005 | Schroth | ................... | B60R 22/14 |
| | | | | 280/808 |
| 2019/0135225 A1 * | 5/2019 | Kim | ........................ | B60R 22/20 |

FOREIGN PATENT DOCUMENTS

| | | | | | |
|---|---|---|---|---|---|
| KR | 20040082916 A | * | 9/2004 | | |
| WO | WO-0034086 A1 | * | 6/2000 | ........... | B60R 22/105 |
| WO | WO-2022231565 A1 | * | 11/2022 | ........... | B60R 22/105 |

\* cited by examiner

SAFETY DEVICE FOR SECURING DISABLED PERSONS IN VEHICLES

This application relates to U.S. Provisional Application 63/167,081, filed Mar. 28, 2021, which is hereby incorporated by reference in its entirety.

FIELD OF THE INVENTION

The invention relates to vehicle safety devices generally and, more particularly, to a method and/or apparatus for implementing a safety device for securing disabled children in vehicles.

BACKGROUND

Seat belts are commonly used in vehicles to secure a passenger to a seat. Typically, a seat belt fastens around a waist of the passenger. In the event of an accident, the seat belt restrains the passenger to the seat instead of the passenger being thrown around the cabin of the vehicle. Seat belts in modern vehicles include a shoulder strap and a waist strap to better restrain the torso of the passenger to the seat and the seat back in the event of an accident.

Restraint harnesses have been used in vehicles to secure children to bench seats. For example, a restraint vest that utilizes a pair of straps that laterally encircle the torso of the wearer with a pair of straps that extend from the anterior side of the torso over the shoulders to the posterior side of the torso. Anchoring straps are secured to the seat back or to a floor of the vehicle and fasten to points on the vest.

It would be desirable to implement a safety device for securing disabled children in vehicles.

SUMMARY

The invention concerns a restraint harness for securing a passenger in a seat of a vehicle comprising a plurality of lateral straps, a pair of shoulder straps, a pair of crotch straps, and a plurality of D-ring connectors. The plurality of lateral straps may be configured to encircle a torso of the passenger. At least two lateral straps comprise a flexible portion allowing the restraint harness to accommodate a variety of torso diameters. The pair of shoulder straps generally extend over left and right shoulders of the passenger from an anterior side of the restraint harness to a posterior side of the restraint harness. The pair of crotch straps generally extend from an anterior side of the restraint harness to a posterior side of the restraint harness. The plurality of D-ring connectors is generally disposed on the posterior side of the restraint harness and configured to provide four points of attachment between the posterior side of the restraint harness and the seat of the vehicle.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing a safety device for securing disabled children in vehicles that may (i) offer more secure restraint, (ii) provide D-ring adjustable crotch straps, (iii) utilize a childproof safety buckle, (iv) provide easy adjustment of front straps, (v) reduce time caregiver is within reach of disabled children for safety of caregiver, and/or (vi) provide improved fit for better comfort.

A restraint harness is disclosed for securing a passenger who is in a sitting position to a seat in a vehicle. The harness has a plurality of lateral torso straps configured to be placed around the torso of the passenger and fastened together. A pair of shoulder straps extend over the shoulders and intersect with the torso straps. A pair of crotch (or groin) straps extend between the legs and intersect with one of the torso straps. D-ring fasteners are located on the back of the hardness for connection to a seat strap fastened to a seat back of the vehicle. An existing vehicle seat belt may also be fastened to the harness to further secure the passenger to the seat.

Figure 1:
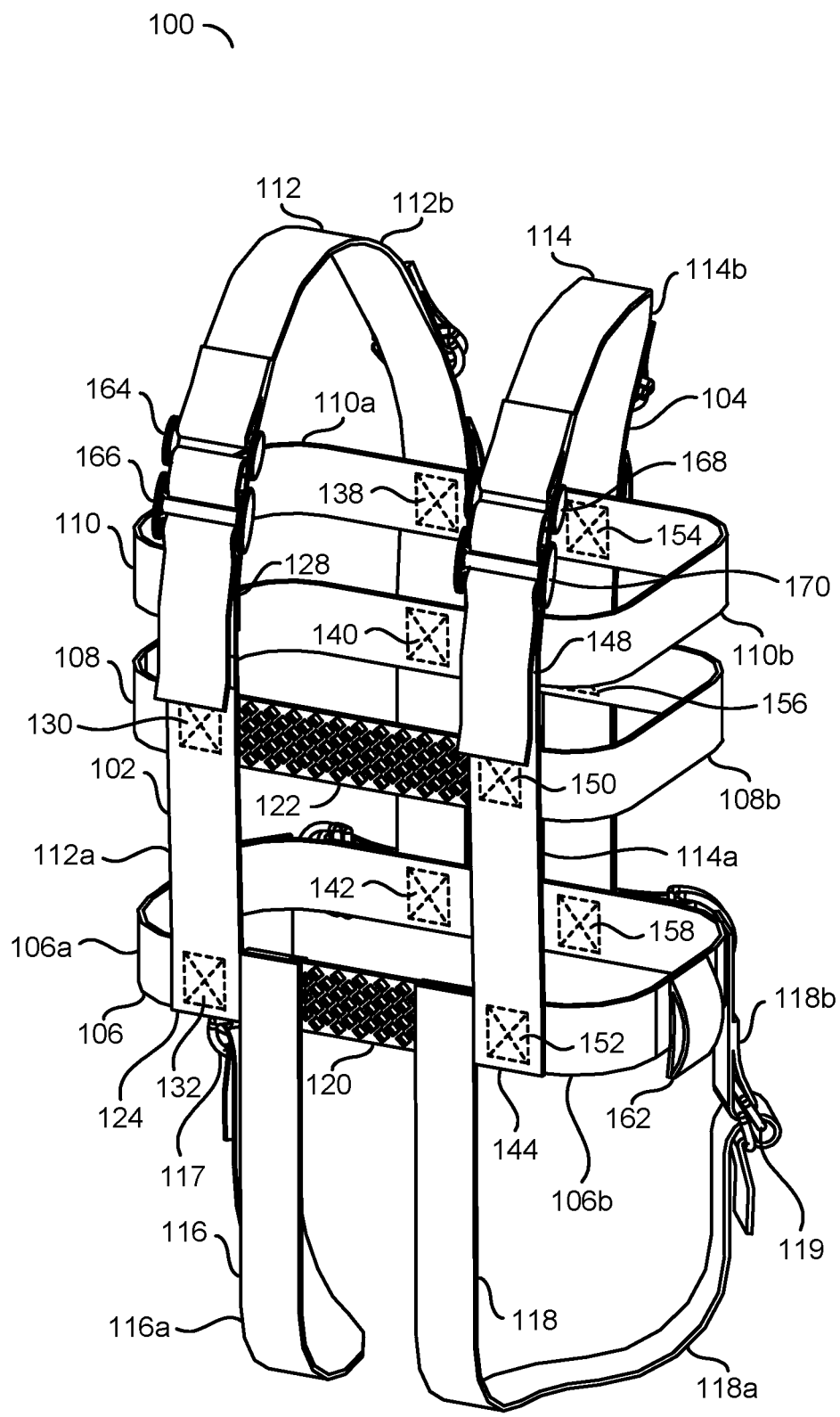
FIG. 1 is a diagram of a front perspective view of a restraint harness in accordance with an example embodiment of the invention.

Referring to FIG. 1, a diagram illustrating a front perspective view of a restraint harness in accordance with an example embodiment of the invention is shown. In various embodiments, a harness 100 has an anterior (or front) side 102 (illustrated in FIG. 1) and a posterior (or back) side 104 (illustrated in FIG. 2). In various embodiments, the harness 100 generally comprises a plurality of torso straps, a pair of shoulder straps, and a pair of groin straps. In various embodiments, the straps may be made from a commercially available nylon webbing, similar to the material used for automobile seat belts, safety harnesses, etc. In an example, the harness 100 may comprise a hip or pelvic region strap 106, a first chest strap 108, and a second chest strap 110. The hip or pelvic region strap 106 may be configured to laterally encircle or encompass the hips (or waist) of a wearer. The first chest strap 108 is generally parallel to the hip or pelvic region strap 106 and laterally encircles or encompasses a middle portion of a chest area of the wearer (e.g., at about a bottom of the rib cage). The second chest strap 110 is generally parallel to the hip or pelvic region strap 106 and the first chest strap 108. The second chest strap 110 generally laterally encircles or encompasses an upper portion of the chest area of the wearer (e.g., at about an underarm area).

In various embodiments, the pair of shoulder straps are configured to fit over the shoulders of the passenger and to intersect with and be fastened to the hip or pelvic region strap 106, the first chest strap 108, and the second chest strap 110 at intersection points. In an example, the hip or pelvic region strap 106 comprises a right portion 106*a* and a left portion 106*b*, the first chest strap 108 comprises a right portion 108*a* and a left portion 108*b*, and the second chest strap 110 comprises a right portion 110*a* and a left portion 110*b*. A right shoulder strap 112 generally extends from the right shoulder along the anterior side 102 to intersect with and be fastened to a first end of the right portion 110*a* of the second chest strap 110, a first end of the right portion 108*a* of the first chest strap 108, and then a first end of the right portion 106*a* of the hip or pelvic region strap 106 on the anterior side 102. The right shoulder strap 112 also extends from the right shoulder along the posterior side 104 to intersect with and be fastened to a second end of the right portion 110*a* of the second chest strap 110, a second end of the right portion 108*a* of the first chest strap 108, and then a second end of the right portion 106*a* of the hip or pelvic region strap 106 on the posterior side 104. In an example, the right shoulder strap 112 comprises an anterior portion 112*a* and a posterior portion 112*b*. The anterior portion 112*a* and the posterior portion 112*b* are generally coupled together in a manner that allows adjustment of a length of the right shoulder strap 112. In an example, the right shoulder strap 112 may be attached to the hip or pelvic region strap 106, the first chest strap 108, and the second chest strap 110 by nylon stitching. In an example, the right shoulder strap 112 may be stitched to the hip or pelvic region strap 106, the first chest strap 108, and the second chest strap 110 using conventional techniques.

Similarly, a left shoulder strap 114, which is opposite to the right shoulder strap 112, extends from the left shoulder along the anterior side 102 to intersect with and be fastened to a first end of the left portion 110*b* of the second chest strap 110, a first end of the left portion 108*b* of the first chest strap 108, and then a first end of the left portion 106*b* of the hip or pelvic region strap 106 on the anterior side 102. The left shoulder strap 114 also extends from the left shoulder along the posterior side 104 to intersect with and be fastened to a second end of the left portion 110*b* of the second chest strap 110, a second end of the left portion 108*b* of the first chest strap 108, and then a second end of the left portion 106*b* of the hip or pelvic region strap 106 on posterior side 104. In an example, the left shoulder strap 114 comprises an anterior portion 114*a* and a posterior portion 114*b*. The anterior portion 114*a* and the posterior portion 114*b* are generally coupled together in a manner that allows adjustment of a length of the left shoulder strap 114. In an example, the left shoulder strap 114 may be attached to the hip strap 106, the first chest strap 108, and the second chest strap 110 by nylon stitching. In an example, the left shoulder strap 114 may be attached to the hip or pelvic region strap 106, the first chest strap 108, and the second chest strap 110 using conventional techniques. The right shoulder strap 112 and the left shoulder strap 114 are generally parallel with each other.

A right crotch (or groin) strap 116 extends from the first end of the right portion 106*a* of the hip or pelvic region strap 106 on the anterior side 102 to the second end of the right portion 106*a* of the hip or pelvic region strap 106 on the posterior side 104. The right crotch strap 116 is generally fastened to the hip or pelvic region strap 106 in close proximity to the right shoulder strap 112. In an example, the right crotch strap 116 comprises an anterior portion 116*a* and a posterior portion 116*b*. The anterior portion 116*a* and the posterior portion 116*b* are generally coupled together in a manner that allows adjustment of a length of the right groin strap 116. In an example, the anterior portion 116*a* and the posterior portion 116*b* are generally coupled together on the posterior side 104 by a first pair of D-rings 117. In an example, the first pair of D-rings 117 may be attached to the posterior portion 116*b* of the right crotch strap 116 by forming a loop with an end of the posterior portion 116*b* of the right crotch strap 116 around the first pair of D-rings 117 and stitching the loop closed. An end of the anterior portion 116*a* of the right crotch strap 116 may be threaded through the first pair of D-rings 117 to secure the anterior portion 116*a* and the posterior portion 116*b* together.

An opposite left crotch (or groin) strap 118 extends from the first end of the left portion 106*b* of the hip or pelvic region strap 106 on the anterior side 102 to the second end of the left portion 106*b* of the hip or pelvic region strap 106 on the posterior side 104. The left crotch strap 118 is generally fastened to the hip strap 106 in close proximity to the left shoulder strap 114. In an example, the left crotch strap 118 comprises an anterior portion 118*a* and a posterior portion 118*b*. The anterior portion 118*a* and the posterior portion 118*b* are generally coupled together in a manner that allows adjustment of a length of the left crotch strap 118. In an example, the anterior portion 118*a* and the posterior portion 118*b* are generally coupled together on the posterior side 104 by a second pair of D-rings 119. In an example, the second pair of D-rings 119 may be attached to the posterior portion 118*b* of the left crotch strap 118 by forming a loop with an end of the posterior portion 118*b* of the left crotch strap 118 around the second pair of D-rings 119 and stitching the loop closed. The anterior portion 118*a* of the left crotch strap 118 may be threaded through the second pair of D-rings 119 to secure the anterior portion 118*a* and the posterior portion 118*b* together. In an example, the right groin strap 116 and left groin strap 118 may be attached to the hip strap 106 by nylon stitching.

In an example embodiment, the first end of the right portion 106*a* of the hip or pelvic region strap 106 may be connected to the first end of the left portion 106*b* of the hip or pelvic region strap 106 on the anterior side 102 by a first linking strap 120. In an example, the first linking strap 120 may comprise a section of stretch mesh. Similarly, the first end of the right portion 108*a* of the first chest strap 108 may be connected to the first end of the left portion 108*b* of the first chest strap 108 on the anterior side 102 by a second linking strap 122. In an example, the second linking strap 122 may comprise a section of stretch mesh. In an example embodiment, the second chest strap 110 may comprise stretch mesh similar to the first linking strap 120 and the second linking strap 122. Using the stretch mesh for the first linking strap 120 and the second linking strap 122 generally provides an improved fit for better comfort. In an example, the stretch mesh may allow the restraint harness 100 to automatically adjust to variations in girth of different wearers.

In various embodiments, the right shoulder strap 112 has a first end 124 adjacent to the first end of the right portion 106*a* of the hip or pelvic region strap 106 on the anterior side 102 and a second end 126 adjacent to the second end of the right portion 106*a* of the hip or pelvic region strap 106 on the posterior side 104. The right shoulder strap 112 intersects on the anterior side 102 with the second chest strap 110 at an intersection point 128, the first chest strap 108 at an intersection point 130, and with the hip or pelvic region strap 106 at an intersection point 132, which is adjacent to the first end 124 of the right shoulder strap 112. The right shoulder strap 112 intersects on the posterior side 104 with the second chest strap 110 at an intersection point 138, with the first chest strap 108 at an intersection point 140, and with the hip or pelvic region strap 106 at an intersection point 142, which is adjacent to the second end 126 of the right shoulder strap second 112. In an example, the straps are sewn together at the intersection points using nylon stitching.

Likewise, the left shoulder strap 114 has a first end 144 adjacent to the first end of the left portion 106b of the hip or pelvic region strap 106 on the anterior side 102 and a second end 146 adjacent to the second end of the left portion 106b of the hip or pelvic region strap 106 on the posterior side 104. The left shoulder strap 114 intersects on the anterior side 102 with the second chest strap 110 at an intersection point 148, with the first chest strap 108 at an intersection point 150, and with the hip or pelvic region strap 106 at an intersection point 152, which is adjacent to the first end 144 of the left shoulder strap 114. The left shoulder strap 114 intersects on the posterior side 104 with the second chest strap 110 at an intersection point 154, with the first chest strap 108 at an intersection point 156, and with the hip or pelvic region strap 106 at an intersection point 158, which is adjacent to the second end 146 of the left shoulder strap 114. In an example, the straps are sewn together at the intersection points using nylon stitching.

In an example, the hip strap 106 has a right side seat belt loop 160 (not visible) on the right side portion 106a of the hip strap 106 and a left side seat belt loop 162 on the left side portion 106b of the hip strap 106. In an example, the anterior portion 112a of the right shoulder strap 112 and the posterior portion 112b of the right shoulder strap 112 are coupled together using a first coupling 164 and a second coupling 166. In an example, the anterior portion 114a of the left shoulder strap 114 and the posterior portion 114b of the left shoulder strap 114 are coupled together using a third coupling 168 and a fourth coupling 170.

Figure 2:
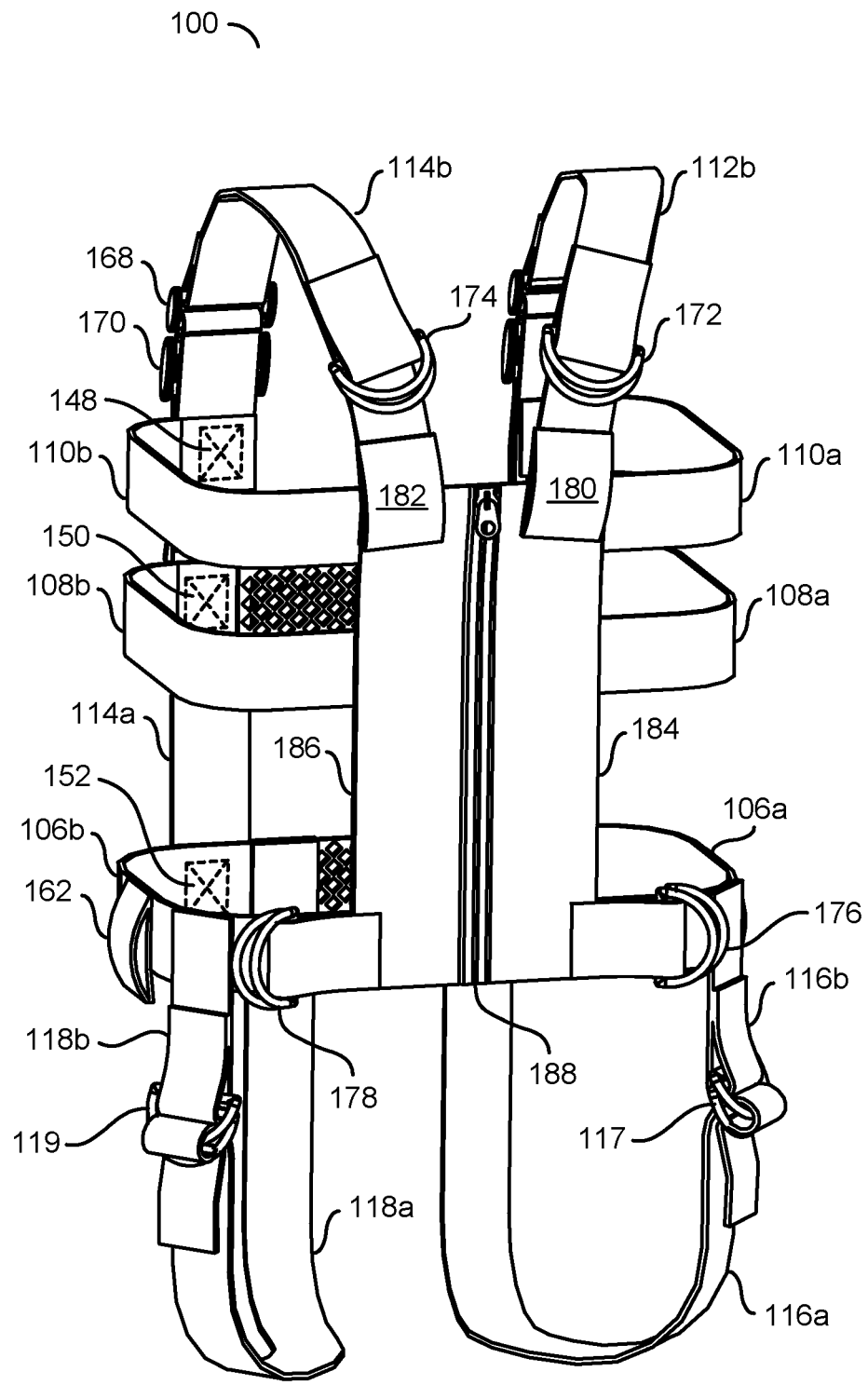
FIG. 2 is a diagram of a rear perspective view of a restraint harness in accordance with an example embodiment of the invention.

Referring to FIG. 2, a diagram illustrating a rear perspective view of the restraint harness 100 of FIG. 1 is shown. In various embodiments, a third pair of D-rings 172 is attached to the right shoulder strap 112 on the posterior side 104, a fourth pair of D-rings 174 is attached to the left shoulder strap 114 on the posterior side 104, a fifth pair of D-rings 176 is attached to the right side of the hip or pelvic region strap 106 on the posterior side 104, and a sixth pair of D-rings 178 is attached to the left side of the hip or pelvic region strap 106 on the posterior side 104. In an example, each of the third pair of D-rings 172, the fourth pair of D-rings 174, the fifth pair of D-rings 176, and the sixth pair of D-rings 178 may be attached to the posterior side 104 of the restraint harness 100 by forming a respective section of strap material into a loop around the respective pair of D-rings and stitching (e.g., using nylon stitching) the respective loops closed and to the respective locations on the posterior side 104 of the restraint harness 100.

In an example, a belt loop 180 may be attached at the intersection 138 between the posterior portion 112b of the right shoulder strap 112 and the second end of the right portion 110a of the second chest strap 110. In an example, a belt loop 182 may be attached at the intersection 154 between the posterior portion 114b of the left shoulder strap 114 and the second end of the left portion 110b of the second chest strap 110.

A right back panel 184 may be attached adjacent to the right shoulder strap 112, the second end of the right portion 110a of the second chest strap 110, the second end of the right portion 108a of the first chest strap 108, and the second end of the right portion 106a of the hip strap 106 on the posterior side 104. A left back panel 186 may be attached adjacent to the left shoulder strap 112, the second end of the left portion 110b of the second chest strap 110, the second end of the left portion 108b of the first chest strap 108, and the second end of the left portion 106b of the hip strap 106 on the posterior side 104. A fastener (e.g., a zipper) 188 may be attached between the right back panel 184 and the left back panel 186. The fastener 188 generally allows the restraint harness 100 to be put on and taken off easily. In an example, the right back panel 184 and the left back panel 186 may comprise a fabric. In an example, the right back panel 184 and the left back panel 186 may comprise an elastic fabric such as SPANDEX. In an example, the fastener 188 may be made from a plastic (e.g., nylon, etc.) material. In another example, the fastener 188 may be made from a metal (e.g., steel, etc.) material. In an example, the fastener 188 may comprise #10 flat coil heavy duty zipper. However, other types of adjustable fasteners (e.g., hook and loop fasteners) may also be suitable.

Figure 3:
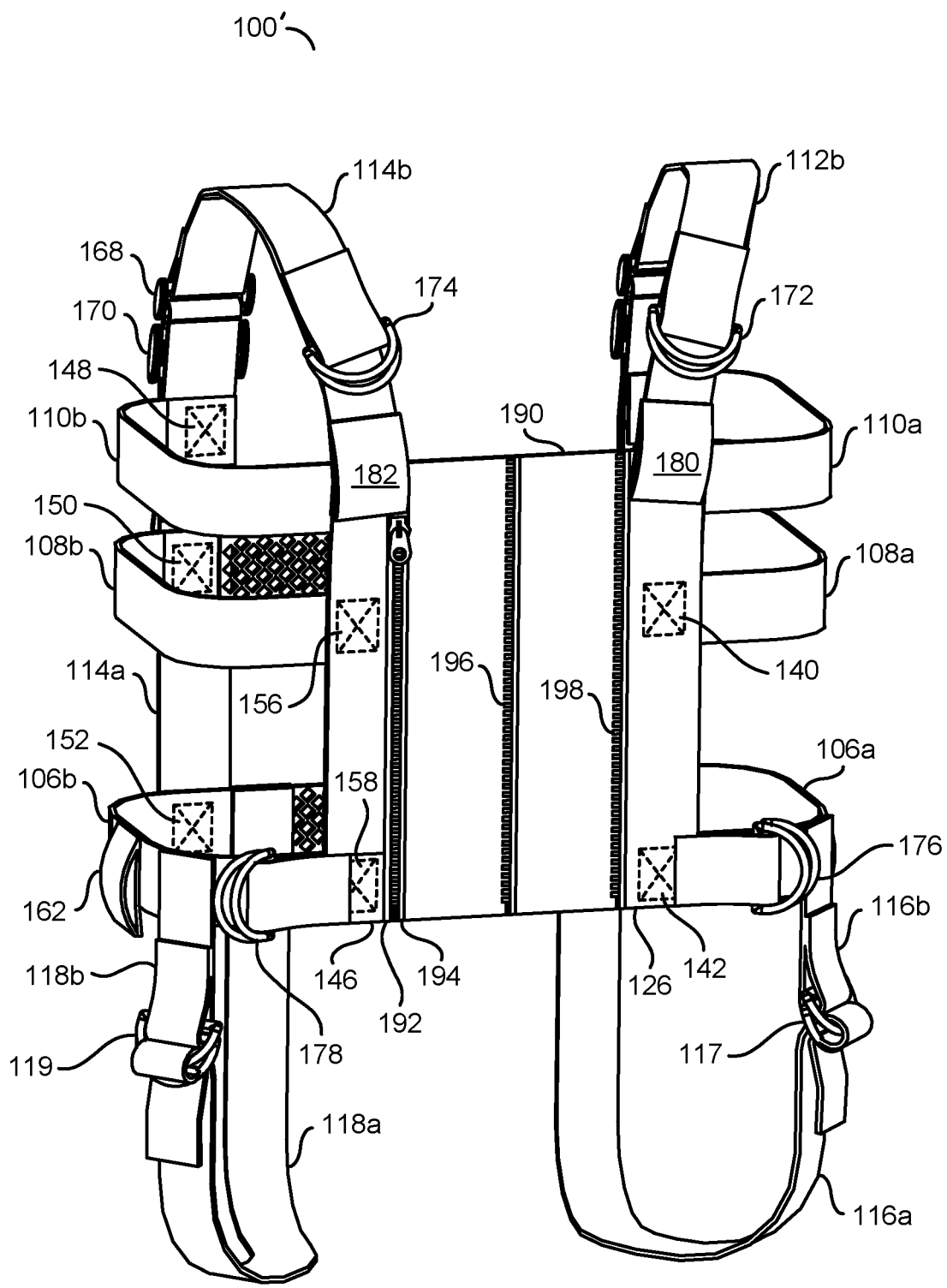
FIG. 3 is a diagram of a rear perspective view of a restraint harness in accordance with another example embodiment of the invention.

Referring to FIG. 3, a diagram illustrating a rear perspective view of a restraint harness 100' is shown. In various embodiments, the restraint harness 100' may be implemented similarly to the restraint harness 100 except for a back panel (or section) 190 replacing the right back panel 184 and the left back panel 186. In various embodiments, the third pair of D-rings 172 is attached to the right shoulder strap 112 on the posterior side 104, the fourth pair of D-rings 174 is attached to the left shoulder strap 114 on the posterior side 104, the fifth pair of D-rings 176 is attached to the right side of the hip or pelvic region strap 106 on the posterior side 104, and the sixth pair of D-rings 178 is attached to the left side of the hip or pelvic region strap 106 on the posterior side 104.

A right edge of the back panel 190 is attached adjacent to the right shoulder strap 112, the second end of the right portion 110a of the second chest strap 110, the second end of the right portion 108a of the first chest strap 108, and the second end of the right portion 106a of the hip or pelvic region strap 106 on the posterior side 104. A first zipper half (or portion) 192 is attached adjacent to the left shoulder strap 114, the second end of the left portion 110b of the second chest strap 110, the second end of the left portion 108b of the first chest strap 108, and the second end of the left portion 106b of the hip strap 106 on the posterior side 104. A second zipper half (or portion) 194 is attached to a left edge of the back panel 190. A third zipper half (or portion) 196 is attached along a center line of the back panel 190. A fourth zipper half (or portion) 198 is attached to the right edge of the back panel 190 adjacent to the right shoulder strap 112. In an example, the zipper halves 192, 194, 196, and 198 are attached using nylon stitching. A zipper lever (or toggle or slider) is generally slidably attached to the first zipper half (or portion) 192. The first zipper half (or portion) 192 is generally complementary to the zipper halves (or portions) 194, 196, and 198. The zipper halves (or portions) 194, 196, and 198 generally cooperate with the first zipper half (or portion) 192 and the zipper lever to open and close the back of the restraint harness 100. The multiple zipper half arrangement with width extensions between each zipper half generally allows the restraint harness 100 to be fastened to a number of wearers with varying torso widths and diameters. For a large torso, the zipper halves 192 and 194 may be used. For a medium torso, the zipper halves 192 and 196 may be used. For a smaller torso, the zipper halves 192 and 198 may be used. When using the zipper halves 196 and 198, the extra material may be folded internal of the restraint harness 100. In an example, the back panel 190 may be made from a specially treated canvas other durable and flame retardant material.

Figure 4:
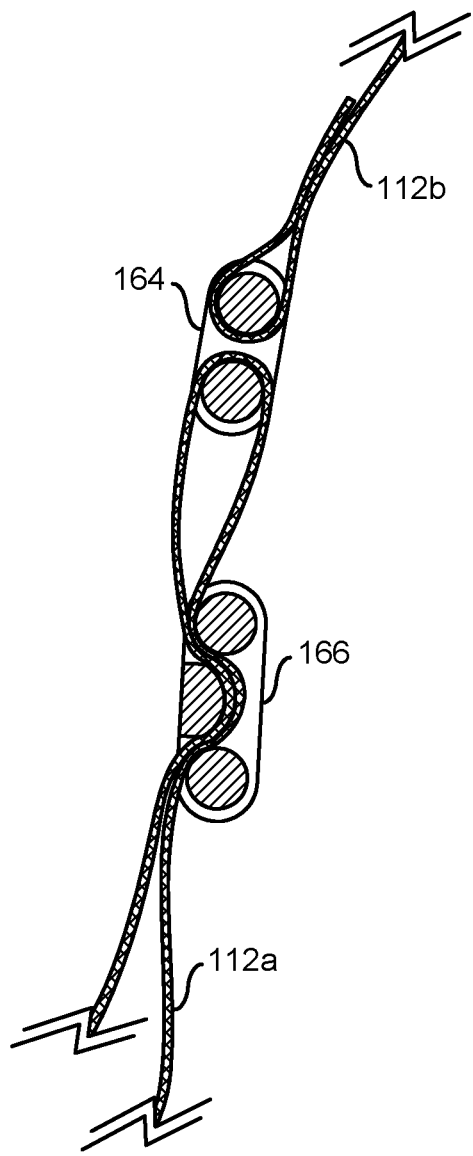
FIG. 4 is a diagram of a cross-sectional side view of a right shoulder strap adjustment of a restraint harness in accordance with an example embodiment of the invention.

Referring to FIG. 4, a diagram of a cross-sectional side view of a right shoulder strap adjustment of a restraint harness in accordance with an example embodiment of the invention is shown. In an example, the right shoulder strap 112 comprises an anterior portion 112a and a posterior portion 112b. Similarly, the left shoulder strap 114 comprises an anterior portion 114a and a posterior portion 114b. The right shoulder strap 112 has a first coupling 164 and a second coupling 166, which connect the right shoulder strap anterior portion 112a to the right shoulder strap posterior portion 112b. The first coupling 164 and the second coupling 166 cooperate together to form a length adjusting slide fastener. The right shoulder strap anterior portion 112a and the right shoulder strap posterior portion 112b cooperate with each other via the length adjusting slide fastener formed by the first coupling 164 and the second coupling 166.

In an example, the first coupling 164 is a simple buckle in which the right shoulder strap posterior portion 112b is attached by a loop formed in the end of the right shoulder strap posterior portion 112b and secured around a first post of the first coupling 164. A free end of the right shoulder strap anterior portion 112a may be threaded through a set of three posts in the second coupling 166, then around a second post of the first coupling 164, and back through the second coupling 166. The right shoulder strap anterior portion 112a is generally fed through the first coupling 164 and the second coupling 166 so as to allow the length of the right shoulder strap 112 to be adjusted to a variety of lengths.

Similarly, the left shoulder strap 114 has a length adjusting slide fastener formed by the third coupling 168 and the fourth coupling 170. The left shoulder strap anterior portion 114a and the left shoulder strap posterior portion 114b cooperate with each other via the length adjusting slide fastener formed by the third coupling 168 and the fourth coupling 170. In an example, the third coupling 168 is a simple buckle in which the left shoulder strap posterior portion 114b is attached by a loop formed in the end of the left shoulder strap posterior portion 114b and secured around a first post of the third coupling 168. A free end of the left shoulder strap anterior portion 114a may be threaded through a set of three posts in the fourth coupling 170, then around a second post of the third coupling 168, and back through the fourth coupling 170. The left shoulder strap anterior portion 114a is generally fed through the third coupling 168 and the fourth coupling 170 so as to allow the length of the left shoulder strap 114 to be adjusted to a variety of lengths.

In an example, the first coupling 164 and the second coupling 166 may be wrapped in a cover that provides cushion between the body of the wearer and the first coupling 164 and the second coupling 166. In an example, the cover may be made of a simulated lambs wool. In an example, the cover may have complementary hook and loop fasteners so that the cover may be fastened around the first coupling 164 and the second coupling 166. In an example, the cover may be sewn to the right shoulder strap 112, so that the cover does not become unfastened and lost from the restraint harness 100. In an example, the third coupling 168 and the fourth coupling 170 may be wrapped in a similar cover.

Figure 5:
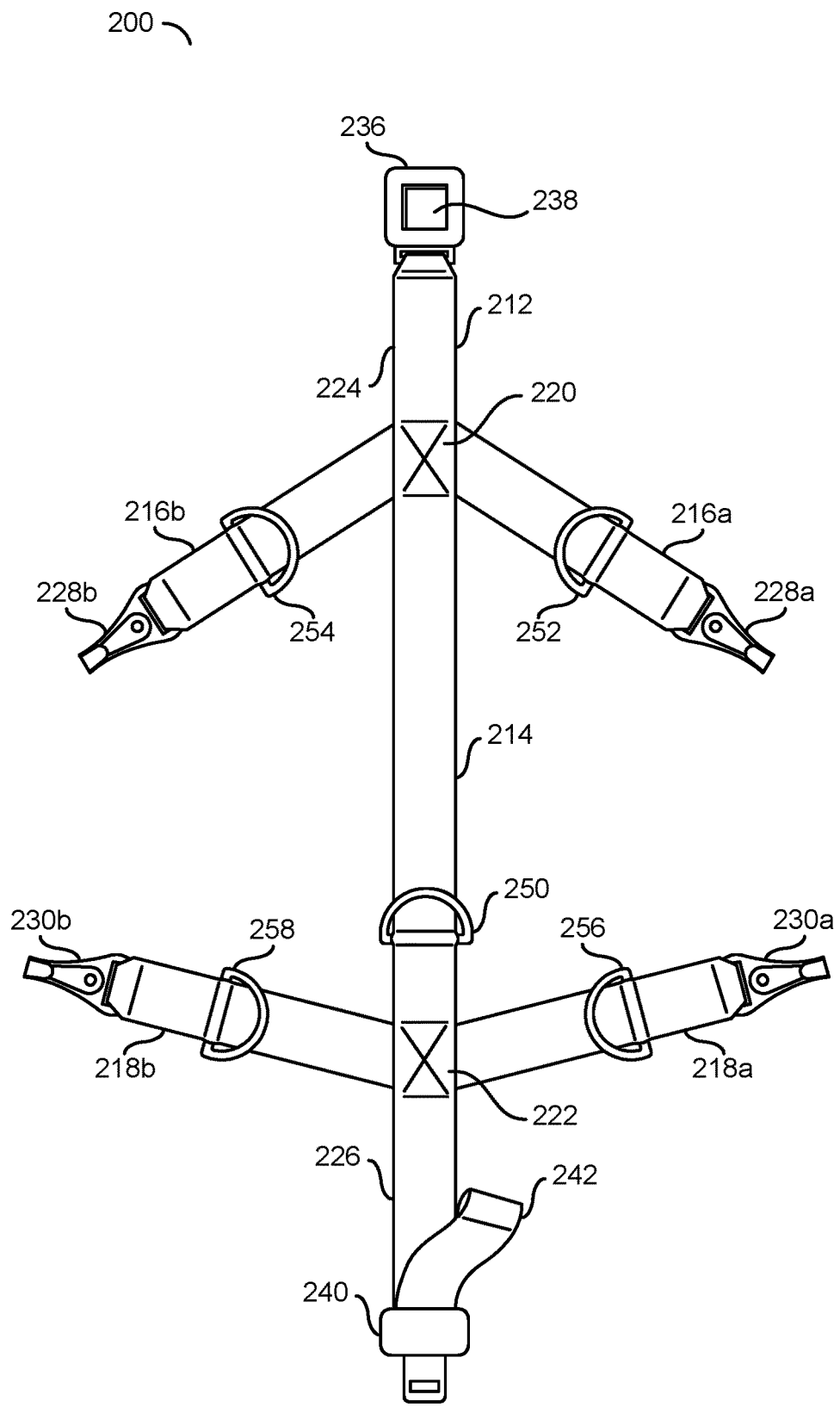
FIG. 5 is a diagram of a seat strap in accordance with an example embodiment of the invention.

Referring to FIG. 5, a diagram of a seat strap 200 is shown. The seat strap 200 generally comprises an assembly of straps that are configured to secure the restraint harness 100 to a seat of a vehicle. In various embodiments, the seat strap 200 has a main longitudinal strap 212 with a center portion 214. A pair of first connecting straps 216a and 216b extend from the main longitudinal strap 212 at an acute angle, facing the center portion 214. The first connecting straps 216a and 216b may be sewn to the main longitudinal strap 212 at an intersection point 220. In an example, nylon stitching may be used. A pair of second connecting straps 218a and 218b extend from the main longitudinal strap 212 at an acute angle, facing the center portion 214 and facing the opposing first connecting straps 216a and 216b. In an example, the first connecting straps 216b and 216b and the second connecting straps 218a and 218b may be symmetrical to each other. In another example, the first connecting straps 216b and 216b may be longer than the second connecting straps 218a and 218b. The second connecting straps 218a and 218b are generally sewn to the main longitudinal strap 212 at an intersection point 222. In an example, nylon stitching may be used.

The longitudinal strap 212 generally has a first strap extension 224 extending outwardly from the intersection point 220. A female buckle 236 with a release mechanism 238 may be attached at the end of the first strap extension 224. The longitudinal strap 212 may also have a second strap extension 226 extending outwardly from the intersection point 222. A male buckle 240 that is complimentary to the female buckle 236 may be attached to the end of the second strap extension 226. In an example, a third strap extension 242 is generally threaded through the male buckle 240 and may be used to adjust the overall length of the longitudinal strap 212.

At the termination point of the first connecting straps 216a and 216b is a first pair of snap connectors 228a and 228b. Likewise, at the termination point of the second connecting straps 218a and 218b is a second pair of snap connectors 230a and 230b. The first pair of snap connectors 228a and 228b are generally configured to attach to the two pairs of D-rings 172 and 174. The second pair of snap connectors 230a and 230b are generally configured to attach to the two pairs of D-rings 176 and 178.

In an example, a D-ring 250 may be attached to the center portion 214. In an example, the D-ring 250 may be positioned along the center portion 214 to be closer to the intersection point 222. In an example, a D-ring 252 may be attached to the first connecting strap 216a. In an example, the D-ring 252 may be positioned along the first connecting strap 216a between the intersection point 220 and the snap connector 228a. In an example, a D-ring 254 may be attached to the first connecting strap 216b. In an example, the D-ring 254 may be positioned along the first connecting strap 216b between the intersection point 220 and the snap connector 228b. In an example, a D-ring 256 may be attached to the second connecting strap 218a. In an example, the D-ring 256 may be positioned along the second connecting strap 218a between the intersection point 222 and the snap connector 230a. In an example, a D-ring 258 may be attached to the second connecting strap 218b. In an example, the D-ring 258 may be positioned along the second connecting strap 218b between the intersection point 222 and the snap connector 230b.

In various embodiments, the straps may be made from a commercially available nylon webbing, similar to the material used for automobile seat belts. The buckles 236 and 240 may be similar to commercially available seat belt buckles used for motor vehicles.

Figure 6:
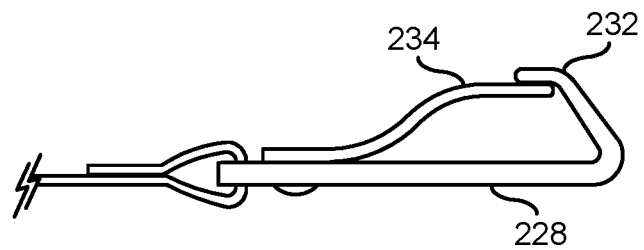
FIG. 6 is a diagram of a snap connector in accordance with an example embodiment of the invention.

Referring to FIG. 6, a diagram illustrating an example snap connector 228 is shown. In an example, the snap connector 228 may be used to implement the snap connectors 228a, 228b, 230a, and 230b. In an example, the snap connectors 228a, 228b, 230a, and 230b may each have a "J" hook 232 and an interlocking spring 234. The first pair of snap connectors 228a and 228b may connect to the shoulder straps 112 and 114 by snapping onto the right and left pairs of D-rings 172 and 174. The second pair of snap connectors 230a and 230b may connect to the hip strap 106 by snapping onto the right and left pairs of D-rings 176 and 178.

Figure 7:
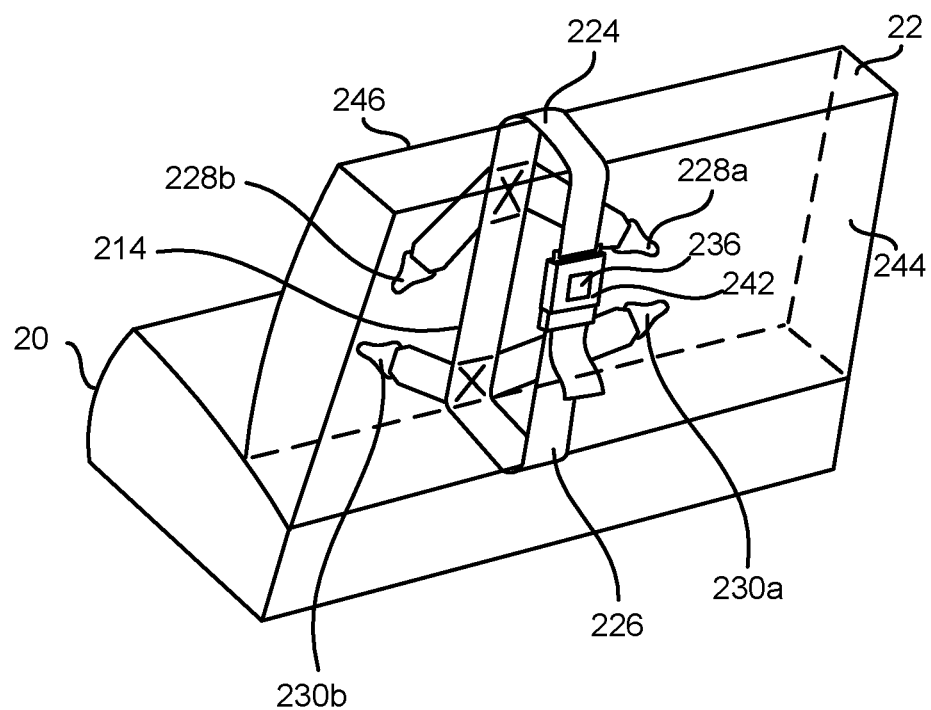
FIG. 7 is a diagram illustrating the seat strap of FIG. 5 installed on a seat.

Referring to FIG. 7, a diagram is shown illustrating the seat strap 200 attached to a seat of a vehicle. The restraint harness 100 is generally fastened around the passenger and fastened together. The restraint harness 100 is then adjusted to fit snugly on the passenger by tightening the straps with the slide adjusters. The seat strap 200 may be placed around a seat back 22. The seat back 22 may have an anterior side 246 and a posterior side 244. The center portion 214 of the seat strap 200 and the connecting straps 216a, 216b, 218a, and 218b may be placed on the seat back anterior side 246. The female and male buckles 236 and 240 may be fastened together on the posterior side 244 of the seat back 22. The passenger may then be placed on the seat 20 in a sitting position, the slack may be removed from the seat strap 200 by pulling on the third strap extension 242. The snap connectors 228a and 228b may be fastened through the pairs of D-rings 172 and 174, respectively. The snap connectors 230a and 230b may be fastened to the pairs of D-rings 176 and 178, respectively. After placement of the restraint harness 100 on the passenger and the fastening of the connector straps to the restraint harness 100, the passenger is secured to the seat in a safe and comfortable sitting position.

Figure 8:
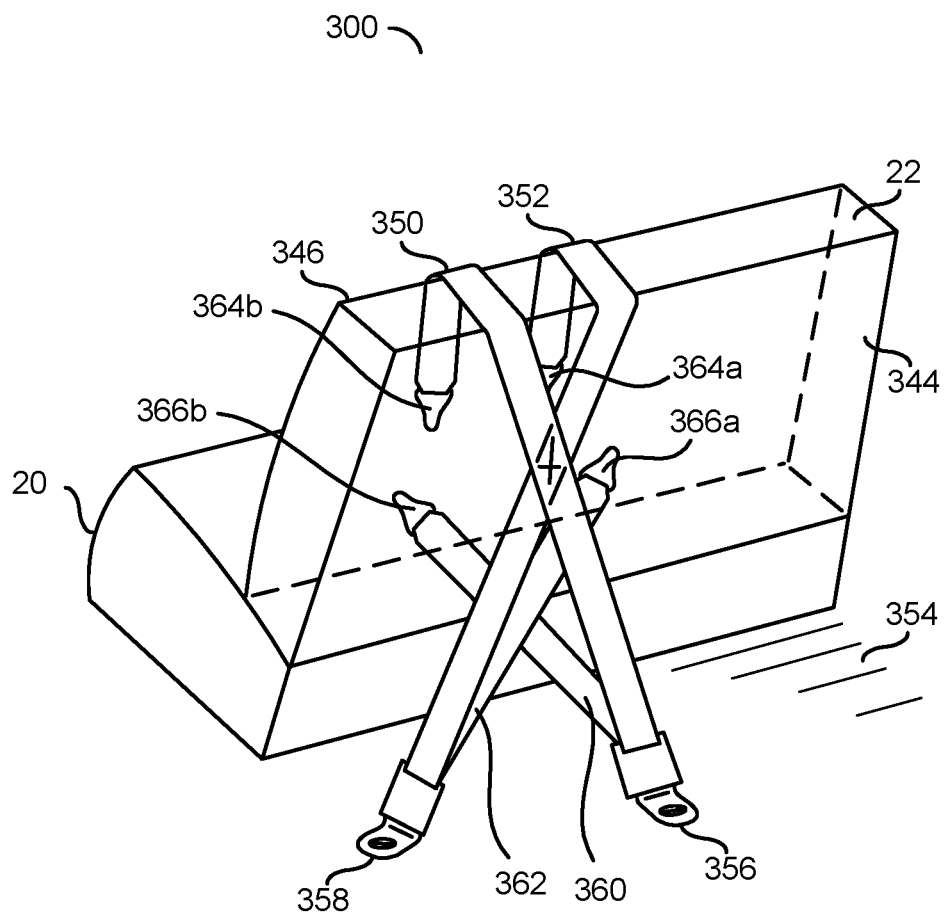
FIG. 8 is a diagram of a seat strap in accordance with another example embodiment of the invention.

Referring to FIG. 8, a diagram of a seat strap in accordance with another example embodiment of the invention is shown. In a separate embodiment, the restraint harness 100 may be attached to a seat strap 300 that is fastened to a floor of the vehicle instead of being fastened to the seat back 22. In an example, the seat strap 300 may be implemented with similar features as the seat strap 200 shown in FIG. 3 and described above, except that the seat strap 300 may be fastened to a floor 354 of the vehicle. The seat strap 300 may have a first strap 350 and a second strap 352. The straps 350 and 352 may be positioned to make an "X" configuration on the posterior side 344 of the seat back 22. A first floor fastener 356 fastens to the floor 354, which secures the first strap 350 to the floor 354. A second floor fastener 358 fastens to the floor 354, which secures the second strap 352 to the floor 354.

A first strap extension 360 extends from the first fastener 356, between the seat bottom and the seat back. The first strap extension 360 is secured to the floor 354 by the first fastener 356. A second strap extension 362 extends from the second fastener 358, between the seat bottom and the seat back, forming an "X" configuration with the strap extensions 360 and 362. The second strap extension 362 is secured to the floor 354 by the second fastener 358.

The first strap 350 and the second strap 352 may each have a snap connector 364b and 364a, respectively, at the termination points adjacent to the seat back. The first strap extension 360 and the second strap extension 362 each have a snap connector 266b and 266a, respectively, at the termination points adjacent to the seat bottom. The snap connector 364b generally fastens to the left shoulder D-rings 174 and the snap connector 364a generally fastens to the right shoulder D-rings 172. Likewise, the snap connector 366b generally fastens to the left hip strap D-rings 178 and the snap connector 366a generally fastens to the right hip strap D-rings 176.

After placement of the restraint harness 100 on the wearer, and the fastening of the seat strap 300 to the restraint harness 100, the seat belt may be placed through the belt loops 160 and 162 of the restraint harness 100. The passenger is then secured to the seat in a safe and comfortable sitting position.

Figure 9:
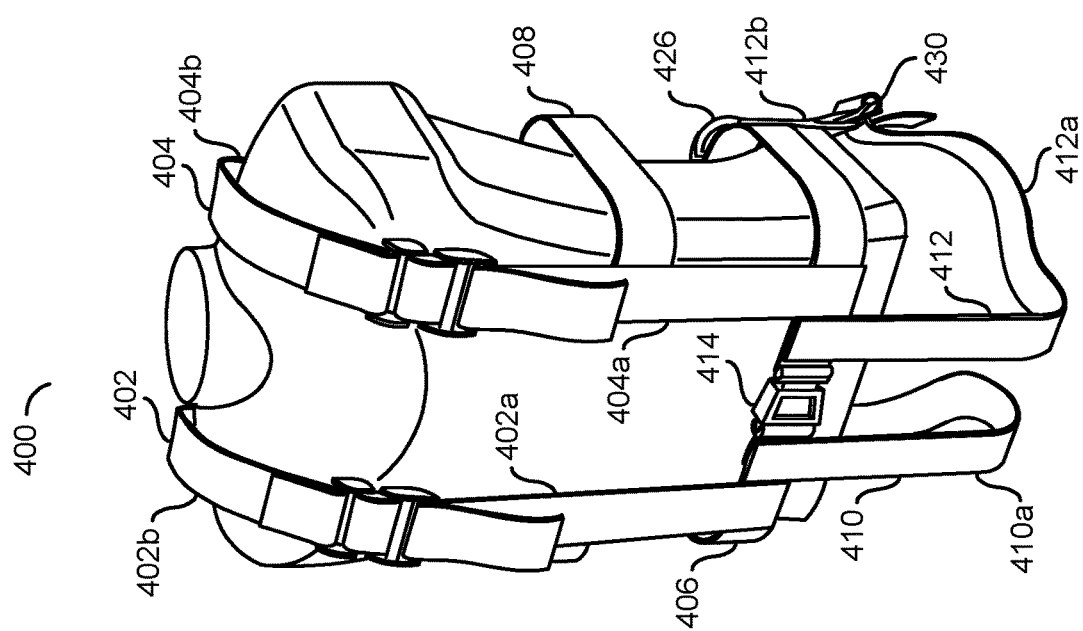
FIG. 9 is a diagram of a front perspective view of a restraint harness in accordance with another example embodiment of the invention.

Referring to FIG. 9, a diagram is shown illustrating a front perspective view of a restraint harness in accordance with another example embodiment of the invention. In another example embodiment, a restraint harness 400 may be implemented similarly to the restraint harness 100, except that the second chest strap 110, the first linking strap 120, the second linking strap 122, the back panels 184 and 186, and the fastener 186 may be omitted. In an example, the first linking strap 120 may be replaced by a child proof safety buckle. In various embodiments, a restraint harness 400 has an anterior (or front) side (illustrated in FIG. 9) and a posterior (or back) side (illustrated in FIG. 10).

In an example, the restraint harness 400 may comprise a right shoulder strap 402, a left shoulder strap 404, a hip or pelvic region strap 406, a first chest strap 408, a crotch (or groin) strap 410, and a second crotch (or groin) strap 412. The hip or pelvic region strap 406 may be configured to laterally encircle or encompass the hips (or waist) of a wearer. The first chest strap 408 is generally parallel to the hip or pelvic region strap 406 and laterally encircles or encompasses a middle portion of a chest area of the wearer (e.g., at about a bottom of the rib cage).

In various embodiments, the pair of shoulder straps 402 and 404 are configured to fit over the shoulders of the passenger and to intersect with and be fastened to the hip or pelvic region strap 406 and the first chest strap 408 at intersection points. The right shoulder strap 402 generally extends from the right shoulder along the anterior side to intersect with and be fastened to a first end of the first chest strap 408, and then a first end of the hip or pelvic region strap 106. The right shoulder strap 402 also extends from the right shoulder along the posterior side to intersect with and be fastened to the first chest strap 108, and then the hip or pelvic region strap 106 on the posterior side. In an example, the right shoulder strap 402 comprises an anterior portion 402a and a posterior portion 402b. The anterior portion 402a and the posterior portion 402b are generally coupled together in a manner that allows adjustment of a length of the right shoulder strap 402 (e.g., similarly to the strap 112 described above in connection with FIG. 1). In an example, the right shoulder strap 402 may be attached to the hip or pelvic region strap 406 and the first chest strap 408 by nylon stitching. In an example, the right shoulder strap 402 may be stitched to the hip or pelvic region strap 406 and the first chest strap 408 using conventional techniques.

Similarly, the left shoulder strap 404, which is opposite to the right shoulder strap 402, extends from the left shoulder along the anterior side to intersect with and be fastened to a second end of the first chest strap 408, and then a second end of the hip or pelvic region strap 406 on the anterior side. The left shoulder strap 404 also extends from the left shoulder along the posterior side to intersect with and be fastened to the first chest strap 408, and then the hip or pelvic region strap 406 on posterior side. In an example, the left shoulder strap 404 comprises an anterior portion 404a and a posterior portion 404b. The anterior portion 404a and the posterior portion 404b are generally coupled together in a manner that allows adjustment of a length of the left shoulder strap 404. In an example, the left shoulder strap 404 may be attached to the hip or pelvic region strap 406 and the first chest strap 408 by nylon stitching. In an example, the left shoulder strap 404 may be attached to the hip or pelvic region strap 406 and the first chest strap 408 using conventional techniques. The right shoulder strap 402 and the left shoulder strap 404 are generally parallel with each other.

The right crotch (or groin) strap 410 extends from the first end of the hip or pelvic region strap 406 on the anterior side to the hip or pelvic region strap 106 on the posterior side. The right crotch strap 410 is generally fastened to the hip or pelvic region strap 106 in close proximity to the right shoulder strap 402. In an example, the right crotch strap 410 comprises an anterior portion 410a and a posterior portion 410b. The anterior portion 410a and the posterior portion 410b are generally coupled together in a manner that allows adjustment of a length of the right groin strap 410. In an example, the anterior portion 410a and the posterior portion 410b are generally coupled together on the posterior side by a first pair of D-rings 428. In an example, the first pair of D-rings 428 may be attached to the posterior portion 410b of the right crotch strap 410 by forming a loop with an end of the posterior portion 410b of the right crotch strap 410 around the first pair of D-rings 428 and stitching the loop closed. An end of the anterior portion 410a of the right crotch strap 410 may be threaded through the first pair of D-rings 428 to secure the anterior portion 410a and the posterior portion 410b together.

An opposite left crotch (or groin) strap 412 extends from the second end of the hip or pelvic region strap 406 on the anterior side to the hip or pelvic region strap 106 on the posterior side. The left crotch strap 412 is generally fastened to the hip or pelvic region strap 406 in close proximity to the left shoulder strap 404. In an example, the left crotch strap 412 comprises an anterior portion 412a and a posterior portion 412b. The anterior portion 412a and the posterior portion 412b are generally coupled together in a manner that allows adjustment of a length of the left crotch strap 412. In an example, the anterior portion 412a and the posterior portion 412b are generally coupled together on the posterior side by a second pair of D-rings 430. In an example, the second pair of D-rings 430 may be attached to the posterior portion 412b of the left crotch strap 412 by forming a loop with an end of the posterior portion 412b of the left crotch strap 412 around the second pair of D-rings 430 and stitching the loop closed. The anterior portion 412a of the left crotch strap 412 may be threaded through the second pair of D-rings 430 to secure the anterior portion 412a and the posterior portion 412b together. In an example, the right groin strap 410 and left groin strap 412 may be attached to the hip strap 406 by nylon stitching. In an example embodiment, the first end of the hip or pelvic region strap 406 may be connected to the second end of the hip or pelvic region strap 406 on the anterior side by a child-proof safety buckle assembly 414.

Figure 10:
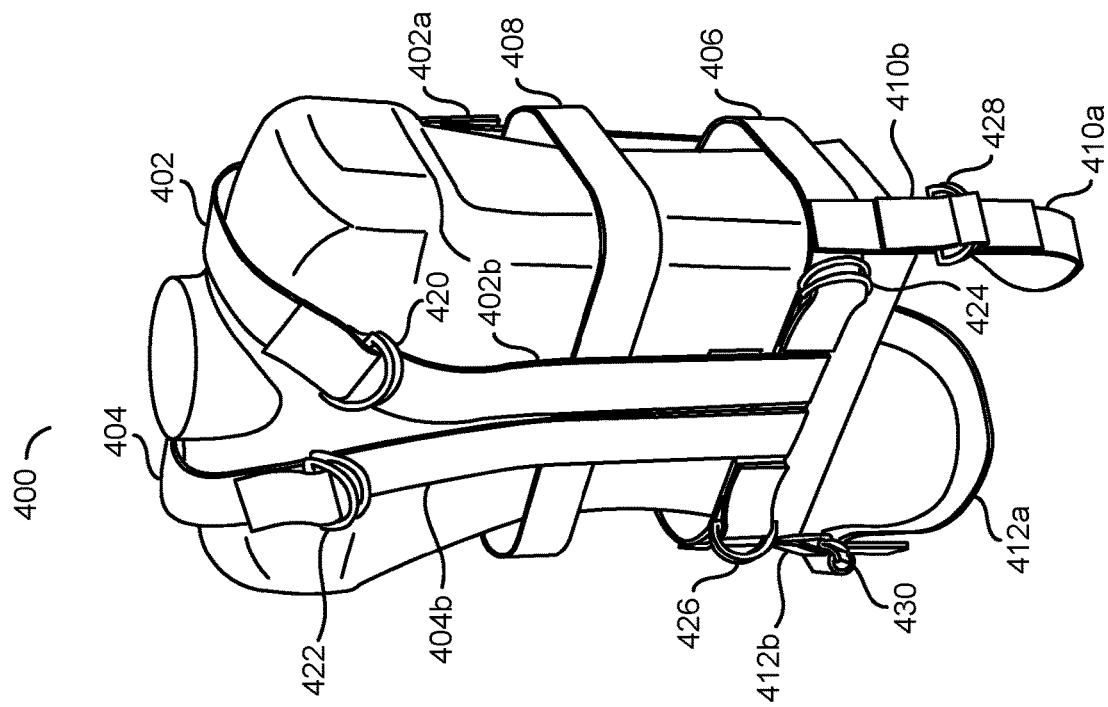
FIG. 10 is a diagram of a rear perspective view of the restraint harness of FIG. 9.

Referring to FIG. 10, a diagram is shown illustrating a rear perspective view of the restraint harness of FIG. 9. In various embodiments, a third pair of D-rings 420 is attached to the right shoulder strap 402 on the posterior side, a fourth pair of D-rings 422 is attached to the left shoulder strap 404 on the posterior side, a fifth pair of D-rings 424 is attached to the right side of the hip or pelvic region strap 406 on the posterior side, and a sixth pair of D-rings 426 is attached to the left side of the hip or pelvic region strap 406 on the posterior side. In an example, each of the third pair of D-rings 420, the fourth pair of D-rings 422, the fifth pair of D-rings 424, and the sixth pair of D-rings 426 may be attached to the posterior side of the restraint harness 400 by forming a respective section of strap material into a loop around the respective pair of D-rings and stitching (e.g.,  using nylon stitching) the respective loops closed and to the respective locations on the posterior side of the restraint harness 400.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A restraint harness for securing a passenger in a seat of a vehicle, comprising:
   a plurality of lateral straps configured to encircle a torso of the passenger, wherein at least two lateral straps comprise a flexible portion allowing said restraint harness to accommodate a variety of torso diameters;
   a pair of shoulder straps extending over left and right shoulders of said passenger from an anterior side of said restraint harness to a posterior side of said restraint harness;
   a pair of crotch straps extending from an anterior side of said restraint harness to a posterior side of said restraint harness, wherein said pair of crotch straps each comprise a length adjusting coupling comprising a pair of D-rings; and
   a plurality of D-ring connectors disposed on said posterior side of said restraint harness and configured to provide four points of attachment between said posterior side of said restraint harness and said seat of said vehicle.

2. The restraint harness of claim 1, wherein each of said plurality of D-ring connectors comprise a pair of D-rings.

3. The restraint harness of claim 1, wherein said shoulder straps each comprise a length adjusting coupling.

4. The restraint harness of claim 1, wherein said plurality of D-ring connectors of said restraint harness are configured to attach to a seat strap fastened to a back of said seat of said vehicle.

5. The restraint harness of claim 1, further comprising:
   a first belt loop attached on said posterior side of said shoulder strap extending over the right shoulder of said passenger;
   and a second belt loop attached on said posterior side of said shoulder strap extending over the left shoulder of said passenger.

6. The restraint harness of claim 1, further comprising:
   a first belt loop attached on a right side of one of said plurality of lateral straps configured to encircle a hip or pelvic region of the passenger; and
   a second belt loop attached on left side of one of said plurality of lateral straps configured to encircle a hip or pelvic region of the passenger.

7. The restraint harness of claim 1, wherein said plurality of lateral straps, said shoulder straps, and said crotch straps are made of a nylon webbing material.

8. The restraint harness of claim 1, wherein said plurality of lateral straps, said shoulder straps, and said crotch straps are attached at intersections using nylon stitching.

9. The restraint harness of claim 1, further comprising:
a right back panel attached on said posterior side adjacent to said shoulder strap extending over the right shoulder of said passenger;
a left back panel attached on said posterior side adjacent to said shoulder strap extending over the left shoulder of said passenger; and
a fastener connecting the right back panel to the left back panel.

10. The restraint harness of claim 9, wherein said fastener comprise a zipper.

11. The restraint harness of claim 9, wherein said right back panel and said left back panel are made of an elastic fabric.

12. A restraint harness for securing a passenger in a seat of a vehicle, comprising:
a plurality of lateral straps configured to encircle a torso of the passenger, wherein at least two lateral straps comprise a flexible portion allowing said restraint harness to accommodate a variety of torso diameters;
a pair of shoulder straps extending over left and right shoulders of said passenger from an anterior side of said restraint harness to a posterior side of said restraint harness;
a pair of crotch straps extending from an anterior side of said restraint harness to a posterior side of said restraint harness;
a plurality of D-ring connectors disposed on said posterior side of said restraint harness and configured to provide four points of attachment between said posterior side of said restraint harness and said seat of said vehicle;
a first zipper half;
a second zipper half;
a third zipper half;
a fourth zipper half; and
a back panel, wherein a right edge of the back panel is attached adjacent to the shoulder strap extending over the right shoulder of said passenger, the first zipper half is attached adjacent to the left shoulder strap extending over the left shoulder of said passenger, the second zipper half is attached to a left edge of the back panel, the third zipper half is attached along a center line of the back panel, the fourth zipper half is attached to the right edge of the back panel adjacent to the shoulder strap extending over the right shoulder of said passenger, and the first zipper half complementary to the second zipper half, the third zipper half, and the fourth zipper half.

13. The restraint harness of claim 12, wherein said back panel is made of a durable and fire retardant fabric.

14. The restraint harness of claim 13, wherein said back panel is made of canvas treated to be fire retardant.

15. A restraint harness for securing a passenger to a seat of a vehicle, comprising:
a plurality of lateral straps configured to encircle a torso of the passenger, wherein at least two lateral straps comprise a flexible portion allowing said restraint harness to accommodate a variety of torso diameters;
a pair of shoulder straps extending over left and right shoulders of said passenger from an anterior side of said restraint harness to a posterior side of said restraint harness; and
a pair of crotch straps extending from an anterior side of said restraint harness to a posterior side of said restraint harness, wherein said pair of crotch straps each comprise a length adjusting coupling comprising a pair of D-rings; and
a plurality of D-ring connectors disposed on said posterior side of said restraint harness and configured to provide four points of attachment between said posterior side of said restraint harness and said seat of said vehicle,
wherein said plurality of lateral straps comprise a hip strap configured to fit laterally around a hip area of said passenger, a first chest strap configured to fit laterally around a lower chest area of said passenger, and a second chest strap configured to fit laterally around an upper chest area of said passenger, said first chest strap and said second chest strap being generally parallel to said hip strap, said shoulder straps extending from each respective shoulder and extending anteriorly and posteriorly along the torso of the passenger to intersect with said first chest strap, said second chest strap, and said hip strap at said anterior side and said posterior side, said shoulder straps being fastened to said first chest strap, said second chest strap, and said hip strap, a left shoulder strap having a left D-ring connector at said posterior side of the left shoulder strap and a right shoulder strap having a right D-ring connector at said posterior side of the right shoulder strap, said hip strap having a left D-ring connector and a right D-ring connector at said posterior side of said hip strap.

16. The restraint harness of claim 15, wherein each of the D-ring connectors comprise a pair of D-rings.

17. The restraint harness of claim 15, wherein said shoulder straps each comprise a length adjusting coupling.

18. The restraint harness of claim 15, wherein said lateral straps, said shoulder straps, and said crotch straps comprise a nylon webbing material.

19. A restraint harness for securing a passenger in a seat of a vehicle, comprising:
a plurality of lateral straps configured to encircle a torso of the passenger, wherein at least two lateral straps comprise a flexible portion allowing said restraint harness to accommodate a variety of torso diameters;
a pair of shoulder straps extending over left and right shoulders of said passenger from an anterior side of said restraint harness to a posterior side of said restraint harness;
a pair of crotch straps extending from an anterior side of said restraint harness to a posterior side of said restraint harness;
a plurality of D-ring connectors disposed on said posterior side of said restraint harness and configured to provide four points of attachment between said posterior side of said restraint harness and said seat of said vehicle;
a right back panel attached on said posterior side adjacent to said shoulder strap extending over the right shoulder of said passenger;
a left back panel attached on said posterior side adjacent to said shoulder strap extending over the left shoulder of said passenger; and
a fastener connecting the right back panel to the left back panel, wherein said right back panel and said left back panel are made of an elastic fabric.

* * * * *